United States Patent
Lovegrove et al.

(10) Patent No.: US 11,488,324 B2
(45) Date of Patent: Nov. 1, 2022

(54) JOINT ENVIRONMENTAL RECONSTRUCTION AND CAMERA CALIBRATION

(71) Applicant: Meta Platforms Technologies, LLC, Menlo Park, CA (US)

(72) Inventors: Steven John Lovegrove, Woodinville, WA (US); Yuheng Ren, Bothell, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 89 days.

(21) Appl. No.: 16/518,862

(22) Filed: Jul. 22, 2019

(65) Prior Publication Data

US 2021/0027492 A1    Jan. 28, 2021

(51) Int. Cl.
*G06T 7/80*  (2017.01)
*G06T 7/521*  (2017.01)

(52) U.S. Cl.
CPC ............... *G06T 7/80* (2017.01); *G06T 7/521* (2017.01); *G06T 2207/30244* (2013.01)

(58) Field of Classification Search
None
See application file for complete search history.

(56) References Cited

U.S. PATENT DOCUMENTS

| | | | |
|---|---|---|---|
| 2017/0295358 A1* | 10/2017 | Cabral | H04N 5/247 |
| 2018/0218513 A1 | 8/2018 | Ho | |
| 2019/0108651 A1* | 4/2019 | Gu | G06N 3/0454 |
| 2020/0042656 A1* | 2/2020 | Zapolsky | G06K 9/00624 |
| 2020/0105019 A1* | 4/2020 | Boyle | G06T 7/521 |
| 2020/0162703 A1* | 5/2020 | Meier | H04N 7/185 |

FOREIGN PATENT DOCUMENTS

WO    WO 2018134686 A2    7/2018

OTHER PUBLICATIONS

International Search Report and Written Opinion for International Application No. PCT/US2020/042426, dated Nov. 3, 2020.

* cited by examiner

*Primary Examiner* — Samuel D Fereja
(74) *Attorney, Agent, or Firm* — Baker Botts L.L.P.

(57) ABSTRACT

In one embodiment, a method includes accessing a calibration model for a camera rig. The method includes accessing multiple observations of an environment captured by the camera rig from multiple poses in the environment. The method includes generating an environmental model including geometry of the environment based on at least the observations, the poses, and the calibration model. The method includes determining, for one or more of the poses, one or more predicted observations of the environment based on the environmental model and the poses. The method includes comparing the predicted observations to the observations corresponding to the poses from which the predicted observations were determined. The method includes revising the calibration model based on the comparison. The method includes revising the environmental model based on at least a set of observations of the environment and the revised calibration model.

20 Claims, 4 Drawing Sheets

JOINT ENVIRONMENTAL RECONSTRUCTION AND CAMERA CALIBRATION

TECHNICAL FIELD

This disclosure generally relates to camera calibration.

BACKGROUND

To ensure accuracy, cameras are often calibrated before they are used to capture measurements or other data used in computer vision and related applications. Inaccurate measurements, regardless of the source of the error, may compound and lead to critical errors in the applications relying on the fundamental measurements. As computer vision applications grow in complexity, so to do the opportunities for measurement error to compound. Many approaches to camera calibration often require special configuration equipment, specially configured environments, or special geometry in an environment. Many approaches also consume significant time and computational resources, increasing the burden caused by performing calibration frequently, despite the high probability of a previous calibration to become inaccurate due to mishandling, changes in environment, and degradation of equipment. Camera calibration techniques may be used with many types of cameras having a digital output.

A mobile computing device—such as a smartphone, tablet computer, or laptop computer—may include functionality for determining its location, direction, or orientation, such as a GPS receiver, compass, gyroscope, or accelerometer. Such a device may also include functionality for wireless communication, such as BLUETOOTH communication, near-field communication (NFC), or infrared (IR) communication or communication with a wireless local area networks (WLANs) or cellular-telephone network. Such a device may also include one or more cameras, scanners, touchscreens, microphones, or speakers. Mobile computing devices may also execute software applications, such as games, web browsers, or social-networking applications. With social-networking applications, users may connect, communicate, and share information with other users in their social networks.

SUMMARY OF PARTICULAR EMBODIMENTS

In particular embodiments, a method for joint environmental reconstruction and camera calibration by a computing device associated with a camera rig include accessing a calibration model for a camera rig. The initial calibration model may be predetermined, for example, by a standard calibration procedure as part of a manufacturer's process. The method may include accessing a first plurality of observations of an environment captured by the camera rig from a plurality of poses in the environment. Information regarding the poses of the camera rig may also be captured when observations of the environment are captured. In particular embodiments the observations of the environment may comprise a depth map (generated, for example, from a depth camera) based on detections of a structured light pattern projected into an environment.

In particular embodiments, the method may include generating an environmental model comprising geometry of the environment based on at least the first plurality of observations, the plurality of poses, and the calibration model. The calibration model may be used to interpret the observations based on the poses. The environmental model may comprise a digital reconstruction of the environment formed by fusing a plurality of estimates of the environment, wherein each estimate of the environment may come from a single observation and pose pairing.

The method may include determining, for one or more poses of the plurality of poses, one or more predicted observations of the environment based on the environmental model and the one or more poses. The predicted observations may be generated by creating a simulated observation of the environment (e.g., through the environmental model) based on the collected poses. The method may include comparing the one or more predicted observations to one or more of the first observations corresponding to the one or more poses from which the one or more predicted observations were determined. The comparison may include determining any differences between the predicted observations and the captured observations. The camera calibration model may be revised on the result of the comparison. The method may include revising the environmental model based on at least a second plurality of observations of the environment and the revised calibration model. The process may continue, alternating between revising the environmental model based on new captured observations and revising the camera calibration model based on the revised environmental model.

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured content (e.g., real-world photographs). The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

The embodiments disclosed herein are only examples, and the scope of this disclosure is not limited to them. Particular embodiments may include all, some, or none of the components, elements, features, functions, operations, or steps of the embodiments disclosed herein. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

There is provided, a method comprising, by a computing device:

accessing a calibration model for a camera rig;

accessing a first plurality of observations of an environment captured by the camera rig from a plurality of poses in the environment;

generating an environmental model comprising geometry of the environment based on at least the first plurality of observations, the plurality of poses, and the calibration model;

determining, for one or more poses of the plurality of poses, one or more predicted observations of the environment based on the environmental model and the one or more poses;

comparing the one or more predicted observations to one or more of the first observations corresponding to the one or more poses from which the one or more predicted observations were determined;

revising the calibration model based on the comparison; and revising the environmental model based on at least a second plurality of observations of the environment and the revised calibration model.

The method may further comprise capturing the first plurality of observations of the environment by:

projecting, by the camera rig, a structured light pattern into the environment;

detecting, by a camera of the camera rig, the projected structured light pattern in the environment; and comparing the detected structured light pattern to a template structured light pattern.

The method may further comprise capturing the first plurality of observations of the environment by:

projecting, by the camera rig, a structured light pattern comprising a plurality of points into the environment;

detecting, by a camera of the camera rig, one or more points of the structured light pattern in the environment;

identifying each of the detected points; and for each identified point, comparing a location of the identified point to a corresponding expected bearing of the identified point in the structured light pattern.

The method may further comprise:

capturing the pose of the camera rig from which each first observation was captured by receiving the pose of the camera rig from a localization system of the camera rig.

The method may further comprise:

initializing the localization system of the camera rig based on output from a motion sensor of the camera rig.

The method may further comprise:

capturing the pose of the camera rig from which each observation was captured by localizing the camera rig based on at least the observation and the calibration model.

Generating the environmental model may comprise geometry of the environment based on at least the first plurality of observations, the plurality of poses, and the calibration model comprises:

generating an estimation of the geometry of the environment from each observation and the pose of the camera rig from which the observation was captured; and combining the estimations generated from each observation to form the environmental model.

The one or more predicted observations and the first plurality of observations may comprise location information for points of a structured light pattern; and comparing the one or more predicted observations to one or more of the first observations corresponding to the one or more poses from which the one or more predicted observations were determined may comprise comparing the location information of each predicted observation with the location information of the respective corresponding first observation.

The calibration model for the camera rig comprises:

intrinsic parameters for a camera of the camera rig;

intrinsic parameters for an emitter of the camera rig;

parameters for performing localization of the camera rig in an environment; or parameters associated with a relationship between the camera and emitter of the camera rig.

Revising the calibration model based on the comparison may comprise:

modifying one or more of the parameters of the calibration model to minimize a difference between one or more predicted observations and one or more of the first observations corresponding to the one or more poses from which the one or more predicted observations were determined.

Alternatively, revising the calibration model based on the comparison may comprise:

calculating a proposed revised calibration model;

generating a prediction of the geometry of the environment based on the proposed revised calibration model, one or more observations of the environment captured by the camera rig from one or more poses in the environment;

comparing the comparison of the one or more predicted observations to one or more of the first observations and the prediction of the geometry; and determining that the comparison satisfies a revision threshold.

Revising the environmental model based on at least the second plurality of observations of the environment and the revised calibration model may comprise:

generating a proposed revised environmental model from the second plurality of observations, a second plurality of poses from which the observations were collected, and the revised calibration model; and comparing the environmental model and the proposed revised environmental model.

The one or more predicted observations of the environment may be determined responsive to receiving a movement of the camera rig from a movement sensor of the camera rig; or the environmental model is revised responsive to receiving a movement of the camera rig from the movement sensor of the camera rig.

The method may further comprise:

prior to revising the environmental model, comparing the received movement of the camera rig to a movement of the camera rig determined based on at least the revised camera calibration model and the second plurality of observations of the environment.

The movement sensor of the camera rig may comprise:

an accelerometer;

a gyroscope;

an ultra-sonic movement sensor;

a magnetometer; or an optical movement sensor.

The camera of the camera rig may be configured to detect infrared light or ultraviolet light.

The camera rig may be incorporated into a head-mounted device.

The camera rig may be incorporated into a hand-held computing device.

There is also provided, one or more computer-readable non-transitory storage media embodying software that is operable when executed to:

access a calibration model for a camera rig;

access a first plurality of observations of an environment captured by the camera rig from a plurality of poses in the environment;

generate an environmental model comprising geometry of the environment based on at least the first plurality of observations, the plurality of poses, and the calibration model;

determine, for one or more poses of the plurality of poses, one or more predicted observations of the environment based on the environmental model and the one or more poses;

compare the one or more predicted observations to one or more of the first observations corresponding to the one or more poses from which the one or more predicted observations were determined;

revise the calibration model based on the comparison; and revise the environmental model based on at least a second plurality of observations of the environment and the revised calibration model.

There is further provided, a system comprising:

one or more processors; and one or more computer-readable non-transitory storage media coupled to one or more of the processors and comprising instructions operable when executed by one or more of the processors to cause the system to:

access a calibration model for a camera rig;

access a first plurality of observations of an environment captured by the camera rig from a plurality of poses in the environment;

generate an environmental model comprising geometry of the environment based on at least the first plurality of observations, the plurality of poses, and the calibration model;

determine, for one or more poses of the plurality of poses, one or more predicted observations of the environment based on the environmental model and the one or more poses;

compare the one or more predicted observations to one or more of the first observations corresponding to the one or more poses from which the one or more predicted observations were determined;

revise the calibration model based on the comparison; and revise the environmental model based on at least a second plurality of observations of the environment and the revised calibration model.

DESCRIPTION OF EXAMPLE EMBODIMENTS

Figure 1:
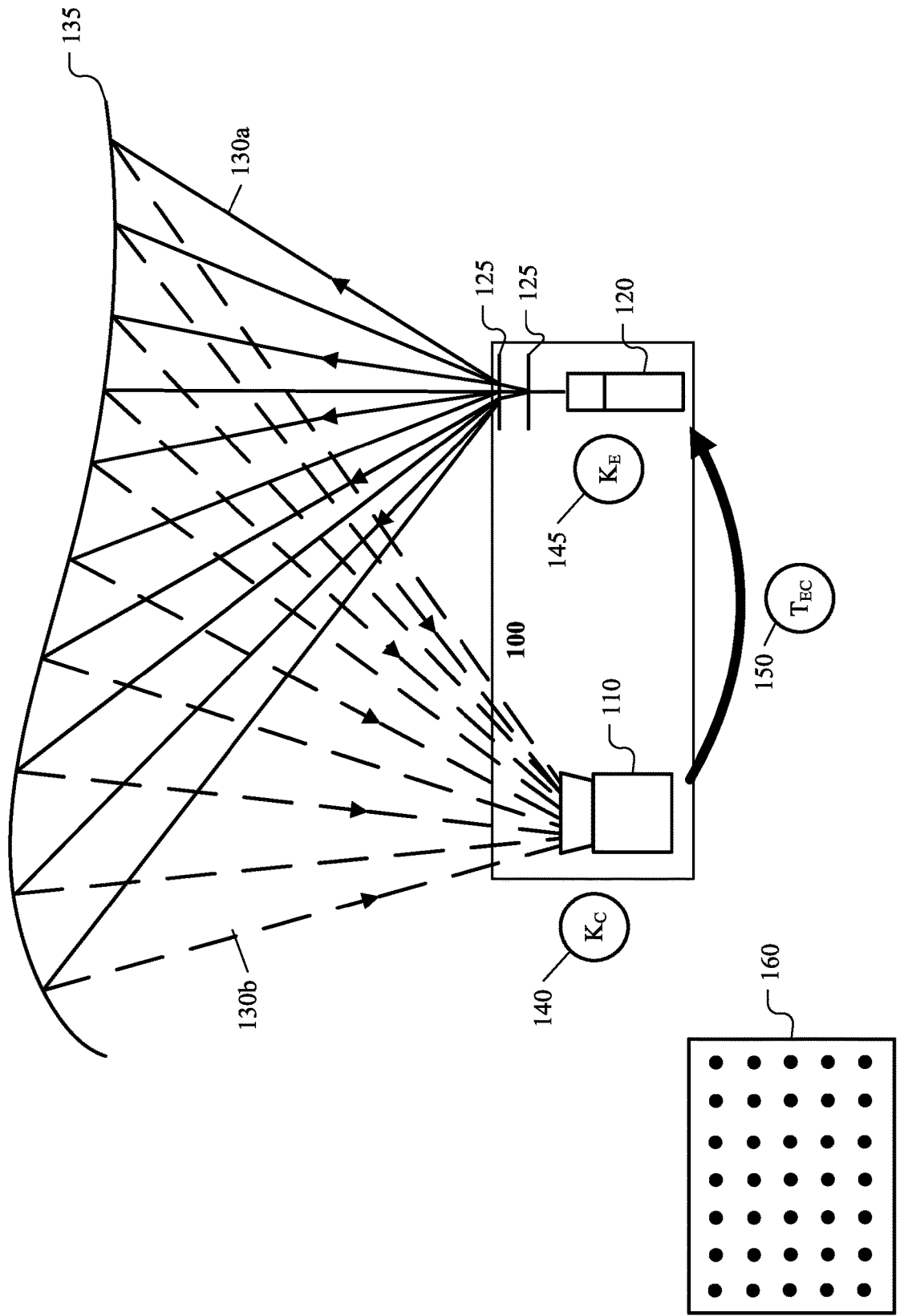
FIG. 1 illustrates an example depth camera rig.

In particular embodiments, a camera rig may comprise components allowing the rig to determine a geometry for an environment surrounding the camera rig. These embodiments may include a depth-sensing camera, or simply "depth camera", that is configured to measure a distance from the camera for objects in the camera's field of view. The output of a depth camera may include a depth map that conveys distances of individual pixels in the image from the camera. This per-pixel depth may be merged with color information provided by another sensor (e.g., an image sensor) of a camera to produce an image with depth information. In particular embodiments, depth cameras may provide still images or output live video showing a depth map for the geometry in the camera's field of view in real time. Depth cameras thus have a wide range of potential uses.

In particular embodiments, the output of individual frames of a depth camera may be used to generate or reconstruct a model for the environment of the depth camera. For example, in "geometric fusion," depth information for an environment may be merged, or "fused," across frames (or other spans of input) into an environmental model. Objects detectable by the camera may be recognized and the position of the object recorded across frames. This may allow for the depth of the object or other recognized portions of an environment, such as a back wall, to be determined based on a combination (e.g., a weighted average) of depths for that object over time. In particular applications, the environmental model may provide a more accurate representation of the environment than may be available using a single depth map, such as from a single image. The pixel color and per-pixel depth from multiple depth maps may be used to generate a detailed environmental model. The resulting model may be a volumetric reconstruction of the environment surrounding the depth camera. However, the computing requirements to perform accurate geometric fusion over time may be quite high, resulting in poor performance for certain real-time operations.

In particular embodiments, the environmental model may be used as part of a process to localize the depth camera in the environment. In one problem of computer vision, known as simultaneous localization and mapping ("SLAM"), the goal is broadly to determine both a map of an environment surrounding an agent and the agent's location within the environment using sensor data from one or more sensors. For example, commonalities between image data from a camera over time may be used to solve the SLAM problem. In particular embodiments, the environmental model may be used to localize the depth camera more efficiently (in terms of speed and computational resources) and more accurately that other solutions. For example, image data received from the camera may be compared to the environmental model to determine the pose of the camera relative to the environment. The depth information from the depth camera may also be used to augment the process, allowing the system to solve ambiguities (e.g., scale, projection, etc.) more efficiently. In some embodiments, the pose may be expressed in terms of the world-coordinate system, e.g., placing the camera within the environment. In some embodiments, the pose may be expressed in terms of the camera-coordinate system, e.g., placing the objects of the environment of the camera. Localizing a depth camera in its environment has a variety of applications. Improving the speed of a localization process opens the uses further to include a variety of real-time applications in fields such as manufacturing (e.g., design or testing of products), entertainment and productivity (e.g., head-mounted devices for artificial-reality applications or head-held devices for internal mapping), autonomous operations, assisted living (e.g., to provide information about the environment to vision- or hearing-impaired persons), and many other fields.

As with many computer vision-related techniques, calibration of the components of a depth camera may impact the accuracy of the environmental model. In some embodiments, calibration may be performed using highly specialized equipment in the attempt to generate an accurate calibration model for the depth camera. For example, inspection equipment may be used by a manufacturer or a quality assurance provider to determine whether the depth camera exhibits manufacturing defects or abnormalities. Similarly, automated techniques may rely on carefully constructed calibration environments that may include specialized calibration targets and precisely measured distances. Using depth information detected by the depth camera compared against ground truth values (e.g., the known values for the calibration environment), corrections to the depth camera's calibration model may be made. In typical use cases, once the depth camera has been calibrated, then it may be used by an end user.

The quality of the environmental model may be limited by the practical necessity of separating the calibration of a depth camera from actual use. In particular embodiments, calibration parameters may vary over time, in some cases predictably, but often unexpectedly. For example, naturally occurring environmental factors, even subtle ones, may affect the depth camera calibration model due to the precise nature of the calibration used. Changes in ambient heat or pressure may introduce irregularities into the camera calibration. As another example, if the depth camera application requires movement of the camera, for example if it is incorporated into a head-mounted display or a hand-held device, normal movements of the user may introduce irregularities. Furthermore, the depth camera may be subjected to unexpected stress, such as shock (e.g., drops and jostles during shipment or use), extreme temperatures, tampering or other malicious activity, or a variety of others. In applications where precise calibration is a high priority, such as use in high-performance equipment or in real-time operations, the depth camera may be rendered unusable until it can be brought to a calibration specialist or until it is subjected to time-consuming calibration procedures.

In particular embodiments, a joint depth camera-calibration and environmental-reconstruction procedure may significantly improve reconstruction quality while reducing or even eliminating the need for additional calibration targets or a customized environment. Furthermore, in particular embodiments, the computational efficiencies of the joint procedure may allow for calibration to occur as a background operation, where the calibration occurs over time during non-calibration use of the system. The joint calibration and reconstruction procedure may be decomposed into two interrelated estimation problems which may be solved in an alternating, iterative process. In a first step, a calibration model for the depth camera may be accessed or estimated. As an example, nominal manufacturing calibration parameters may be used. As another example, calibration may be performed as part of a manufacturing process. Using the a priori calibration, the geometry of the environment surrounding the depth camera may be estimated. As described in detail throughout this disclosure, the environmental estimate may be based on the calibration model and depth measurements, poses, or other sensor data collected by the depth camera at various points in a specified time frame. As an example, the pose may be determined by or with a SLAM sub-system of the camera rig. As another example, pose may be determined based on one or more movement sensors of the camera rig. Multiple individual estimates of the environmental geometry may be combined into a first iteration of the environmental model, for example using geometric fusion. In a second step, the environmental model may then be used to update the depth camera calibration. The poses from the first step and the environmental modal may be used to generate predictions of the environment. The predictions may be compared to the camera depth or image calculations from the first step, associated with each given pose. Differences between the predictions and captured data may be interpreted as errors. The errors may be corrected by revising the camera calibration model. In this described technique, the depth measurements may be interpreted as a function of the calibration parameters used for the depth camera. The camera calibration model, environmental model, and the joint depth camera-calibration and environmental-reconstruction procedure will now be explained in more detail with reference to the figures of this disclosure.

FIG. 1 illustrates an example depth camera 100 in a rig. The example depth camera 100 comprises two components: a camera 110 and an emitter 120. The emitter 120 may project a structured light pattern into the environment surrounding the depth camera 100. The emitter 120 may produce the light pattern, which is projected through one or more diffractive optical elements 125, which may cause the light pattern to spread through the environment. The light pattern may comprise a plurality of light rays 130a which strikes surfaces 135 in the environment. Light rays 130b reflecting off the surfaces 135 may reach the camera 110. For the purpose of simplicity, only rays reaching the camera 110 are shown. In reality, as the rays 130a strike surfaces 135 in the environment, a plurality of rays may be reflected in any number of possible directions, with a portion reaching the camera 110. Using a variety of parameters, including but not limitation to, camera intrinsic parameters, emitter intrinsic parameters, camera-emitter translation parameters, and other information known about the structured light pattern, the camera 130, or a computing system of the camera, may interpret the reflected light rays 130b to determine depth mapping information for the environment.

The projected light rays may comprise a specified light pattern, e.g., the pattern 160. In particular embodiments, the projection pattern may comprise more than hundreds of light dots projected from the emitter 120. The light dots may be formed by the emitter 120 and multiplied through a duplication process through diffractive optics such as the diffractive optical elements 125. The emitter 120 may be configured to produce light dots in the visible spectrum of light. In particular embodiments, the emitter 120 may be configured to produce light dots beyond the visible spectrum of light, including but not limited to infrared or ultraviolet light. The camera 110 may be configured to detect the light dots, regardless of the chosen wavelength of the light dots. In particular embodiments, the pattern, e.g., pattern 160, emitted by the emitter 120 may comprise a template structured light pattern. In particular embodiments, the expected bearings of the dots of the pattern from the emitter may also be known (whether absolutely or relatively among the dots). The bearings of the dots may be calibrated as part of an independent calibration procedure or as part of the procedures described herein. The information about the bearings of the dots may be used, as described herein, to more accurately detect disturbances in the pattern. The disturbances may then be used to resolve ambiguities regarding the reason for a particular disturbance in the pattern. For example, by comparing detected bearings, or locations, of the dots of the pattern after they have been projected into an environment to the expected individual bearings of the dots, more subtle disturbances of the pattern may be detected. This may in turn allow for more accurate measurements of the environment.

Certain parameters are represented symbolically in FIG. 1. One such set of parameters are camera intrinsic parameters 140 ($K_C$). The camera intrinsic parameters may generally refer to parameters used to simulate the real-world camera relative to an idealized camera. In particular embodiments, the camera intrinsic parameters 140 may include the focal length of the camera, the principal point offset, axis skew, or any other suitable camera intrinsic parameters. The focal length may refer to the distance between the lens and the image sensor. The principal point offset may refer to the location of the the principal ray (the ray passing through the canonical camera pinhole) relative to the origin of the image sensor plane. Axis skew may refer to shear distortion in the captured image. Another set of parameters represented symbolically in FIG. 1 is emitter intrinsic parameters 145 ($K_E$). The emitter intrinsic parameters may refer to parameters used to describe emitter operations relative to an idealized emitter. In particular embodiments, the emitter intrinsic parameters may include information such as the power of the emitter, the arrangement of the diffractive grates 125 relative to the diode of the emitter body 120, the orientation, tilt, index of refraction of one or more of the diffractive grates 125, the wavelength of light used, any other suitable parameters or any suitable combination thereof. Another set of parameters represented symbolically in FIG. 1 is camera-emitter translation parameters 150 ($T_{EC}$). In particular embodiments, the camera-emitter translation parameters 150 may refer to parameters used to measure the physical placement and orientation of the emitter and camera. Because, in particular embodiments, the origin of the light emitted into the environment differs from the location of an image sensor of the depth camera, camera-emitter translation parameters 150 may be used to simulate a unified depth camera-emitter (e.g., in which the emitter and the camera share the same physical space, or are the same device). As the camera and/or emitter may shift due to usage, especially trauma (e.g., falls) the parameters may require revision after the depth camera leaves the manufacturer.

Figure 2:
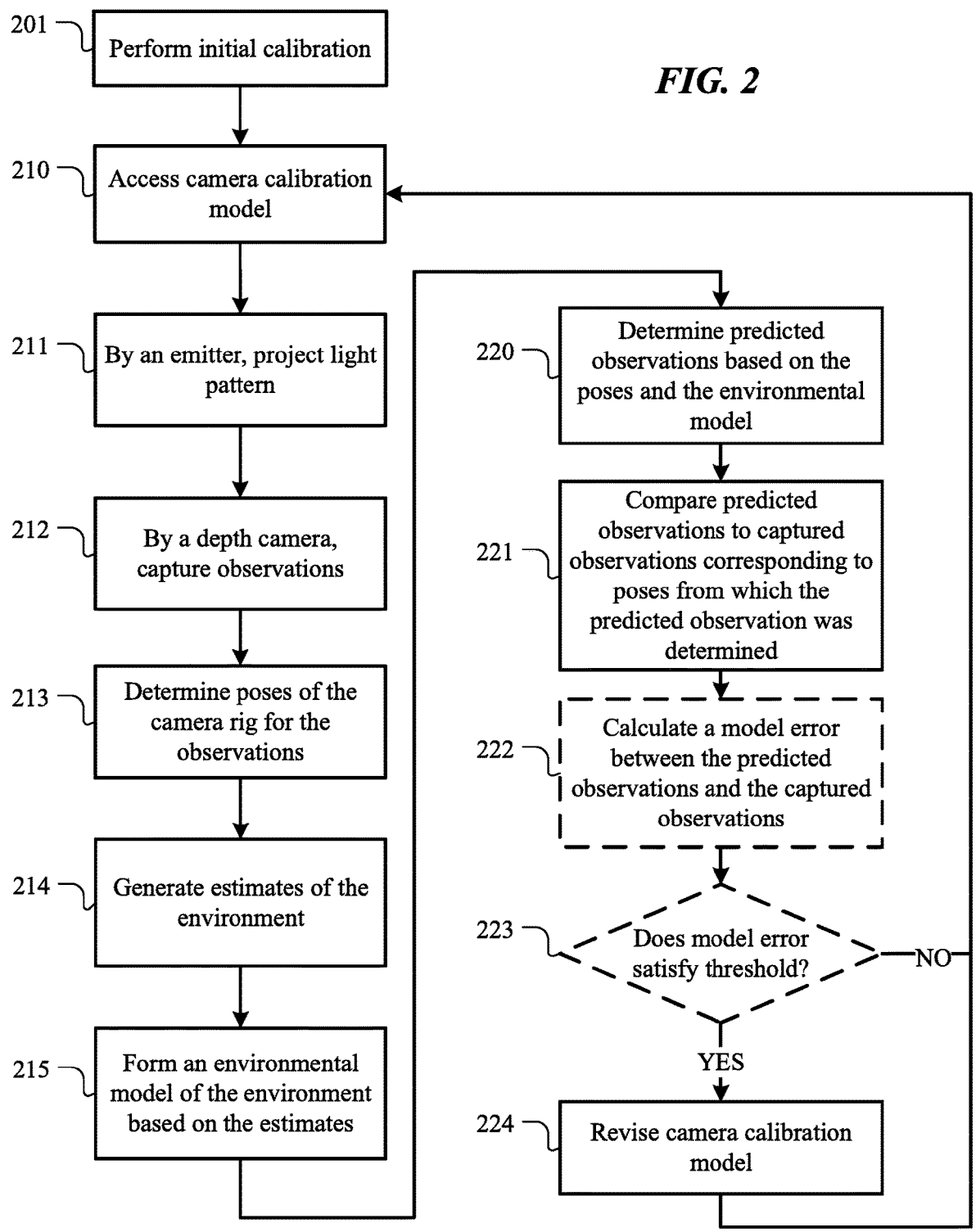
FIG. 2 illustrates an example method for calibration and reconstruction.

FIG. 2 illustrates an example method 200 for calibration of a depth camera and reconstruction of an environment. In particular embodiments, steps of the method 200 may be performed as part of a standardized calibration procedure that is performed during first use of the system, first use in a new environment, or as regular maintenance. In particular embodiments, steps of the method 200 may be performed by the computing system in the background during normal use (e.g., while the system is involved in other non-calibration operations). The method may begin at step 201, in which a computing system associated with a depth camera 110 may perform an initial calibration of a depth camera 110. The initial calibration may be performed by a manufacturer, quality assurance agent, or other qualified calibration agent. The initial calibration may be performed using one or more ground truth configurations, including an environment comprising objects of known size, shape, color, or distance. The initial calibration may be performed before the depth camera is shipped to an intermediate user or end user. In particular embodiments, the initial calibration may be performed by the user on initialization or activation of the depth camera or a system comprising the depth camera. The initial calibration may be performed as part of a first-time use procedure, or as part of regular maintenance.

At step 210, a computing system may access a camera calibration model. During the first iteration of the method, the camera calibration may be received from an initial calibration. However, as will be described throughout this disclosure, the described procedure may be performed repeatedly, iteratively refining both an environmental model and camera calibration model. In those cases, the camera calibration model accessed during step 210 may be a revised camera calibration model. The computing system may use the camera calibration model to interpret observations from a depth camera.

At step 211, an emitter of a camera rig may project a light pattern. The emitter may project the light pattern into an environment of the depth camera. The light pattern may be a structured light pattern based on a template. The template may comprise a specific pattern that may make it simpler to determine where deviations of the pattern occur. For example, the pattern may comprise a grid of evenly spaced dots. If projected into an environment with no geometry but a back surface, the pattern, when detected by a camera, may be the same grid. Of course, even then, the detected grid may have variances caused by adjustments for scale based on the distance of the backwall from the camera rig. If projected into an environment with geometry, the geometry may be detected by deviations of detected grid from the template. These deviations could be used to extrapolate a shape of geometry in the environment causing the deviation. In particular embodiments, the light pattern may be a structured light pattern in which the location of each dot is known, and each dot is individually identifiable. Thus, it may be possible to more accurately determine the geometry of the environment by identifying the degree of deviation associated with each individual dot in addition to the overall pattern.

At step 212, a depth camera of a camera rig may capture observations of the environment. The observations may include traditional color and/or brightness intensity images of the environment. In particular embodiments, the captured observations may include observations of the light pattern projected into the environment by the emitter of the camera rig. For example, a camera of the camera rig may detect a structured light pattern in the environment that had been projected into the environment by an emitter of the camera rig. The structured light pattern may be generated based on a template for the structured light pattern. The computing device (or a system of the camera) may compare the structured light pattern detected in the environment to the template structured light pattern. As another example, each captured observation may include a set of point-to-point correspondences capturing a distortion of the projected light pattern caused by surfaces in the environment. The light pattern projected into the environment by an emitter of the camera rig may be based on a structure light pattern in which the location of each point of the pattern is known or can be determined. As the camera captures observations, it may detect the individual points of the structure light pattern. The camera, or a related system, may identify each individual point of the structured light pattern and may compare the location, or bearing, of each identified point to a corresponding expected location, or bearing, of the identified point in the structured light pattern. By comparing point-to-point correspondences (e.g., the difference between the expected location of a particular point in the observed structured light pattern to the observed location of the particular point), the camera and computing system may produce more accurate depth maps that may account for more subtle variations. The system may be capable of determining potential ambiguities in the structured light pattern, for example those caused by the observation of the light pattern near the corner of a surface. From point-to-point correspondences, the computing system may resolve the ambiguities, because the location of each point may be resolved. In particular embodiments, from the captured observations, the depth camera (or a computing system associated with the depth camera) may generate one or more depth maps.

At step 213, the camera rig may determine poses of the camera rig in the environment. The poses may correspond to the pose of the camera rig at the time that the observation was captured by the depth camera of the camera rig. In particular embodiments, steps 212 and 213 may be performed sequentially in that a pose is determined for each observation. In particular embodiments, a localization system may calculate a plurality of poses of the camera rig in the environment. The number of poses calculated may be equal to the number of discrete observations of the environment captured by the depth camera. For example, if the depth camera is capable of capturing observations coincident with video (e.g., capturing 24, 30, or 60 observations per second), the computing system may calculate an equal number of poses. The poses may be determined from the captured observations in real-time, e.g., by localizing the depth camera in the environment based on the captured observation data and the parameters of the camera calibration model. For example, the localization system may use one or more SLAM methods from images captured by the depth camera to generate an approximate pose of the depth camera relative to the environment. The pose then may correspond to the position of the depth camera at the time that the observation was captured. In particular embodiments, the poses may be determined based on hardware components of the camera rig that are incorporated into the localization system. The hardware components may comprise a movement sensor, such as one or more multi-axis accelerometers, multi-axis gyroscopes (alone or combined with a multi-axis accelerometer into an inertial measurement unit), ultra-sonic movement sensors, magnetometers, optical movement sensors, any other suitable hardware movement sensor, or any component thereof. A pose may be retrieved from one or more hardware components of the localization system at the same time that each observation is captured.

At step 214, the computing system may generate a plurality of estimates of the environment. In particular embodiments, the estimated may be generated based on each captured observation, the corresponding pose of the camera rig at the time that the observation as captured, and the camera calibration model. To generate the estimates of the environment, the computing system may access the captured observations and corresponding poses. As described above, the number of poses calculated may be coincident with the number of captured observations. Each pose may be associated directly with an observation captured by the depth camera by time, so that the pose represents the pose of the depth camera at the time that the observation was captured. A geometric estimation system may access the camera calibration model, the captured observations, and the associated poses. The geometric estimation system may use the parameters of the camera calibration model to interpret the depth camera observations. The geometric estimation system may use the pose associated with each depth camera observation to estimate, approximate, or determine the viewpoint of the camera at the time that the observation was captured. From this, the geometric observation system may determine a "view" of the environment. The geometric observation system may perform these steps for a plurality of the observations (up to, and including, all of the observations). Taken individually, the views may be interpreted as one-off estimates of the environment. They may include information such as a depth map and color map for the environment and possibly individually objects in the environment.

At step 215, a computing system may form an environmental model based on the estimates. The computing system may combine the estimates to form the environmental model of the environment. In particular embodiments, the estimates may be combined using geometric fusion or a related technique. For example, depth information from the captured observations of an environment may be merged across the separate observations. Fusion may produce an environmental model of the environment of the depth camera. The environmental model may be, for example, a three-dimensional reconstruction of the environment over the period of time during which the observations were captured. In some embodiments, to improve processing speed, it may be assumed that the environment does not change considerably over time while a depth camera (or other imaging device) captures the observations. Note that in some embodiments, the computing system may form the environmental model directly from the observations, poses, and camera calibration model.

Steps 210-215 (and other intervening steps) may be referred to as an environmental reconstruction portion of the process. Steps 220-224 may be referred to as a camera calibration portion of the method. In steps 210-215, the environmental model may be created and/or updated as needed based on the captured observations. In steps 220-224, the environmental model may be assumed to be accurate for the purposes of the camera model calibration and kept constant while the camera calibration parameters of the camera calibration model are adjusted.

At step 220, a computing system may determine predicted observations based on the poses and the environmental model. The computing system may determine, for one or more poses of the plurality of poses, one or more predicted observations of the environment based on the environmental model and the one or more poses. In particular embodiments, using the pose information, the computing system may simulate a view into the environment as captured in the environmental model. Given the environmental model, the camera calibration model (including parameters such as depth camera or emitter intrinsic parameters, depth camera or emitter extrinsic parameters, and camera-emitter translation parameters), and a pose, the computing system may predict where the projected emitter dots of the light project will appear when imaged in by the depth camera. To generate a predicted observation (or simply, a prediction), the computing system may simulate a structured light pattern projected into the environment. The light pattern may be a model of the same structured light pattern emitted by the emitter of the camera rig. The prediction may then comprise information about the variations of the light pattern caused by the geometry in the environment, as captured in the environmental model, visible in the view of the environment dictated by the pose. This process may be performed for a plurality of the poses (up to, and including, all poses). In particular embodiments, the computing system may determine the predicted observations in response to detecting a movement of the camera rig. The movement may be detected by a movement sensor (e.g., one of the movement sensors detected above). Thus, the movement of the camera rig may be used as a trigger to begin the camera model calibration portion of the process. The movement may be used as a part of a related process to determine whether re-calibration is required (e.g., to determine whether recalibration is likely to improve the performance of the overall system).

At step 221, for each pose, the computing system may compare predicted observations to the captured observation associated with the pose used to determine the predicted observation. For example, the computing system may compare each predicted observation to an observation captured from the pose from which the predicted observation was determined. As described above, each pose may be associated (e.g., by time) with an observation of the environment captured by the depth camera. In particular embodiments, the captured observations may comprise a variation of the light pattern projected into the environment. Because the prediction and captured observation are based on the same light pattern, the prediction and observation may be compared by comparing the disturbances to the structured light pattern in each. For a particular captured observation, the computing system may be capable of determining how accurate the predicted observation was. Because the environmental model is assumed to be accurate, the predicted observation may serve as a measure of how accurately the camera calibration model accounts for the factors of the camera rig calibration that may be performed.

In particular embodiments, while comparing the predicted observations to the captured observations in step 221, the computing system may, in step 222, compare variations between the captured observation and an associated predicted observation to calculate a model error between the observations and predictions associated with each pose. In particular embodiments, the predicted observations and the captured observations may comprise location information for points of a structured light patter. Then, comparing the predicted observations to the captured observations may comprise comparing the location information of each predicted observation with the location information of the respective corresponding capture observation. Given that the comparison results in an association of an observed light projection pattern to an emitted light projection pattern, the computing system may compare each prediction (e.g., predicted dot pattern) to the observed reality. Differences between the observation and prediction may be combined to calculate a model error (e.g., an error caused by the camera calibration model). Intuitively, as the environmental model in this stage is assumed to be approximately accurate, one source of the error may be assumed to be the camera calibration model which is used with the poses to generate the prediction. In particular embodiments, an additional source of error may be the determined pose itself. In particular embodiments, a motion sensor or motion-detection system may be used to generate an initialization condition for the localization system which may improve the accuracy of the localization system. Furthermore, the output of the motion sensor may be compared to the results of the localization system to determine an accuracy of individual poses, e.g., by comparing a relative change in position of the motion sensor and the localization system. In particular embodiments, as the pose for each captured observation is used to generate a prediction, the pose may be assumed to not be a source of error to simplify the calibration procedure. The goal becomes to find camera parameters (e.g., depth camera or emitter intrinsic parameters, depth camera or emitter extrinsic parameters, and camera-emitter translation parameters) that minimize the model error.

At step 223, the computing system may determine whether the model error satisfies a threshold for revising the camera calibration model. In general, it may difficult to predict the effects of calculating and applying a new set of camera calibration parameters. In some situations, despite efforts to improve the quality of the camera calibration parameters, modifications to the camera calibration procedure may have the potential to worse the accuracy of the observations and resulting environmental model. As the operation of generating a new or revised camera calibration model may consume significant computational resources, the computing system may check to determine whether it is likely that an improvement will result from the recalibration. One approach to do so may be to determine whether the model error (or whatever metric is used to track the results of comparing predicted observations to the captured observations) is such that it is likely that changes made will reduce the error. For example, if the model error is high enough, any change will likely be successful. If the model error was low to begin with, then recomputing the camera calibration model may not significantly improve the error. In particular embodiments, to conserve resources, the computing system may opt to skip recomputing the camera calibration model for this set of observations. Thus, in one example, if the model error does not satisfy the threshold for revising the camera calibration model, the process may continue back to step 210, with the camera calibration model unchanged. If the model error does satisfy the threshold, the process may move on to step 224. In particular embodiments, the threshold may be reversed. That is, the threshold may be to determine whether the accuracy of the camera calibration model is already acceptable. This may be represented by a low model error, and the threshold may be a lower bound on model error that demarcates when the camera calibration model is acceptably accurate. Other methods for determining whether to revise the camera calibration model may be used.

At step 224, the computing system may revise the camera calibration model. In some embodiments, revising the camera calibration model may comprise adjusting the existing model. In some embodiments, the revision process may comprise generating a new camera calibration model based on newly collected information (e.g., the predicted and captured observations and the comparison thereof). In particular embodiments, revising the camera calibration model may comprise modifying or replacing one or more of the parameters of the calibration model to minimize the model error (where it is calculated) or the difference between one or more predicted observations and one or more of the captured observations corresponding to the one or more poses from which the one or more predicted observations were determined.

Formally, to generate a camera calibration model from the predicted observations and captured observations of the environment, the computing system may minimize the following sum of square reprojection error for all observed dot or point-to-point correspondences $\hat{p}_i^k$ in IR image i:

$$E(x) = \sum_{k \in \Omega} \left( p_i^k - \hat{\mathbf{p}}_{i_i}^k(x) \right)^2$$

where $\hat{p}_i$ is the predicted observation of the dot location in the observation i (interpreted as an image):

$$\hat{p}_i = \pi_i(T_{ri}^{-1} \cdot e^\alpha \cdot T_{re} \cdot \chi(N_e, \pi_e^{-1}(p_e; x_e)); x_i)$$

here, where:
- $\pi_i: \mathbb{R}^3 \to \mathbb{R}^2$ is the function which takes a point $P_i \in \mathbb{R}^3$ in IR camera frame i into pixel coordinates $p_i \in \mathbb{R}^2$.
- $\pi_e^{-1}: \mathbb{R}^2 \to \mathbb{R}^3$ is the function representing emitter back-projection, taking emitter 2D dot pattern $p_e \in \mathbb{R}^2$ into the emitter frame vector $P_e \in \mathbb{R}^3$.
- $\chi(n, d, r): \mathbb{R}^3 \times \mathbb{R}^3 \times \mathbb{R}^3 \to \mathbb{R}^3$ is a function that computes the intersection between ray r and plane $N = [n, r]$, $$\chi(n, d, r) = \frac{-d \cdot r}{n^T \cdot r}$$

where $$N_e = [n_e, d_e]^T = T_{wr} \cdot e^\beta \cdot T_{re} \cdot N_w$$

$$N_w, N_e \in \mathbb{R}^4$$

are the planes corresponding to the linearization of the surface in the environment and emitter frames of reference w and e, respectively.

$T_{wr}, T_{ri} \in SE(3)$ are the world-from-rig and rig-from-depth-camera transforms, respectively.

$\alpha$ and $\beta$ are the unknown updates to the frame pose and camera extrinsics.

$x_i$ and $x_e$ are the parameters of the depth camera and emitter projector parameters respectively.

In particular embodiments, revising the camera calibration model may comprise calculating a proposed revised calibration model, e.g., using the methods described herein. The computing system may generate a prediction of the geometry of the environment based on the proposed revised calibration model, one or more observations of the environment captured by the camera rig from one or more poses in the environment. For example, the computing system may use one or more poses associated with one or captured observations to determine a predicted observation using the new camera calibration model. The process for determining the predicted observation may be similar to the process described herein. The computing system may compare the above-described comparison of the one or more predicted observations to one or more of the captured observations and the prediction of the geometry. In particular embodiments, the computing system may calculate a revision effect based on this comparison. The computing system may then compare the revision effect to a revision threshold. Upon determining that the revision threshold is satisfied, the revised camera calibration model may be accepted and substituted for the initial camera calibration model.

As shown in method 200, after revising the camera calibration model or, optionally, after determining that the model error does not satisfy the threshold error, the method may proceed again to step 210. In particular embodiments, the computing system may again revise the environmental model based on the revised camera calibration model. For example, the computing system may perform the operations of the method 200 again using the same captured observations. Because the calibration procedures do not necessarily affect the capture of observations, the same observations may be used repeatedly until a desired level of calibration accuracy is achieved. As another example, the computing system may capture a second set of observations of the environment. Following steps 210-215, the computing system may then perform the steps of the environmental reconstruction portion of the method 200, including up to steps 210-215. This may comprise, at step 212 capturing a second set of observations, and at step 213 determining a second set of poses. The computing system may revise the environmental model based on at least the second set of observations of the environment and the revised camera calibration model.

In particular embodiments, prior to revising the environmental model, the computing system may detect a movement of the camera rig. For example, the computing system may receive a movement of the camera rig from a movement sensor of the camera rig. The environmental model may be determined responsive to the movement. In particular embodiments, the computing system may, prior to revising the environmental model, compare the received movement of the camera rig to a movement of the camera rig determined based on at least the revised camera calibration model and the second plurality of observations of the environment. Based on the comparison, the computing system may determine whether the movement was a genuine movement, or whether the movement was detected in error. If the movement was determined to have been an error, the computing system may not initiate the processes for revising the environmental model to conserve resources.

In particular embodiments, the computing system may revise the environmental model based on at least the second set of observations of the environment and the revised calibration model by generating a proposed revised environmental model from the second set of observations, a second plurality of poses from which the observations were collected, and the revised calibration model using the same procedures as described herein. The computing system may compare the environmental model and the proposed revised environmental model. The computing system may determine an effect of substituting the proposed revised environmental model for the current environmental model to determine if the revising environmental model will benefit the operation of the camera rig and system. If the proposed revised environmental model is determined not to be an improvement (e.g., a calculated error exceeds a threshold), then the proposed revised environmental model may not be used.

The procedures described herein may provide a number of significant advantages to current procedures for reconstructing an accurate environmental model for the environment of a depth camera. The procedures described herein may be more computationally efficient, using less limited resources. This, in turn, may allow for a computing device embodying these techniques to be used for additional tasks, or to be made more energy efficient. The procedures may converge more quickly at the two approximate models (e.g., the camera calibration model and the environmental model) because both are permitted to vary in a nearly simultaneous fashion. This allows for the two to adjust as needed to each other as well as to new information about the environment. Because the process uses depth maps and images from the depth camera, the procedures may be used in tandem with whatever applications are being used by the system. Thus, the system may support refinement of both the camera calibration model and the environmental model during normal operation, reducing delay between user engagement with a system and use. For example, the system may perform the described joint calibration and reconstruction procedures while a user is otherwise engaged with the system. The user does not need to be taking actions that are specifically related to facilitating calibration (e.g., following prompts of the system to facilitate accurate calibration). The user may not even be informed that calibration is occurring. The camera rig and computing system may detect user movement during normal use and use that movement as a trigger to determine whether or not further camera rig calibration or environmental reconstruction should be performed. These, and many other benefits will be appreciable to those of skill in the arts.

Particular embodiments may repeat one or more steps of the method of FIG. 2, where appropriate. Although this disclosure describes and illustrates particular steps of the method of FIG. 2 as occurring in a particular order, this disclosure contemplates any suitable steps of the method of FIG. 2 occurring in any suitable order. Moreover, although this disclosure describes and illustrates an example method for calibration of a depth camera and reconstruction of an environment including the particular steps of the method of FIG. 2, this disclosure contemplates any suitable method for calibration of a depth camera and reconstruction of an environment including any suitable steps, which may include all, some, or none of the steps of the method of FIG. 2, where appropriate. Furthermore, although this disclosure describes and illustrates particular components, devices, or systems carrying out particular steps of the method of FIG. 2, this disclosure contemplates any suitable combination of any suitable components, devices, or systems carrying out any suitable steps of the method of FIG. 2.

Figure 3:
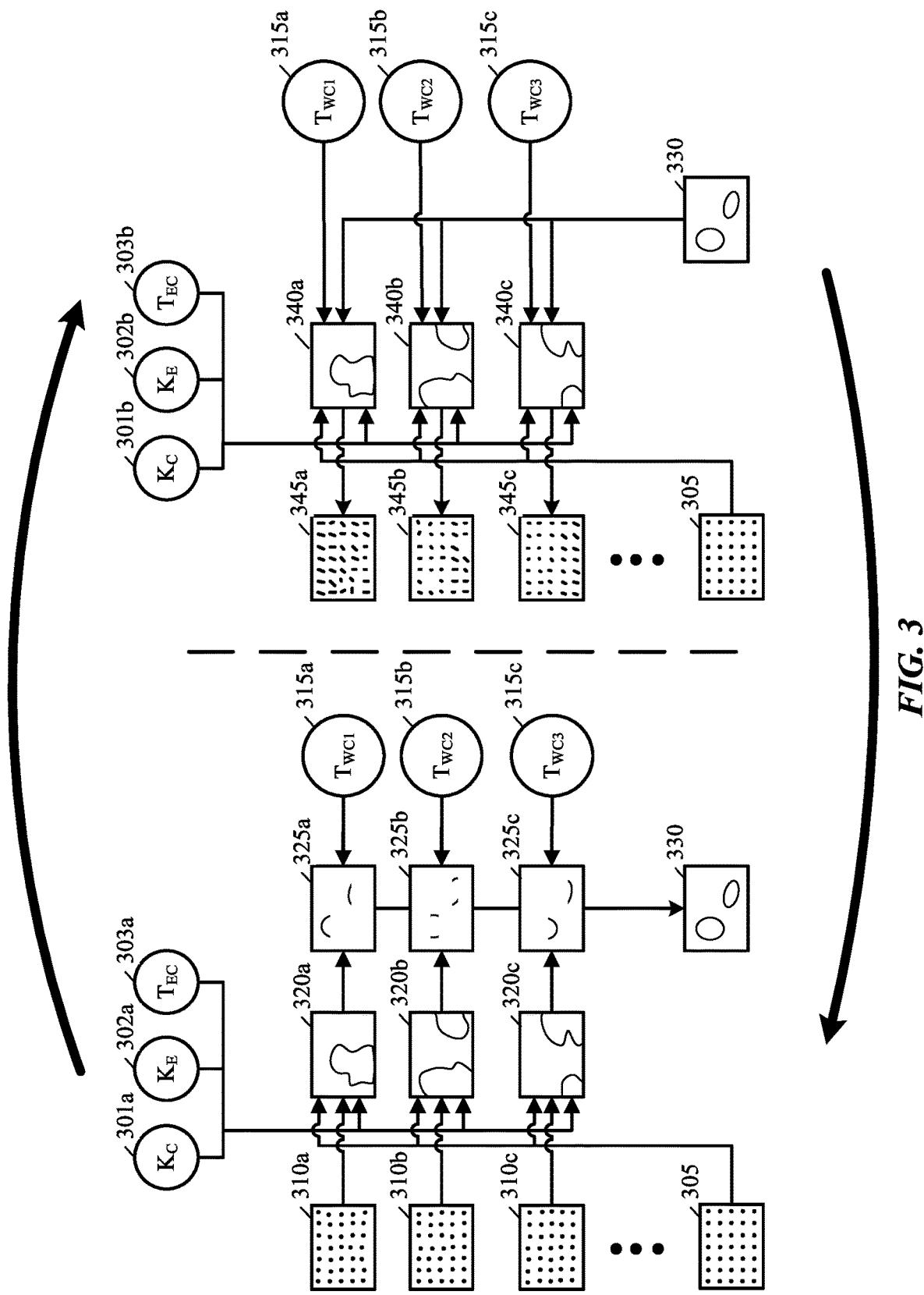
FIG. 3 illustrates an example of calibration and reconstruction.

FIG. 3 illustrates an alternating iterative process for calibration and reconstruction in a schematic fashion. The side of FIG. 3 left of the central dividing line may represent a "reconstruction" phase while the side of FIG. 3 right of the central line may represent a "calibration" phase. During the reconstruction phase, a computing system of a camera rig (e.g., a camera rig 100) may be provided with one or more parameters of a calibration model for the camera rig (e.g., following step 210 of the method 200). For example, parameters of the calibration model for the camera rig may comprise camera intrinsic parameters ($K_C$) 301a, emitter intrinsic parameters ($K_E$) 302a, and camera-to-emitter translation parameters ($T_{EC}$) 303a.

A computing system associated with the camera rig may generate an environmental model. As in step 211 of method 200, an emitter (e.g., emitter 120) may emit a structured light pattern 305 into an environment. The pattern 305 may comprise information about an overall structure of the light pattern and/or may comprise information about an expected bearing or expected location of each dot of the light pattern. As in step 212 of method 200, a camera (e.g., depth camera 110) may detect the structured light pattern in a series of captured observations, 310a, 310b, and 310c, etc. These observations may comprise a variation of the structured light pattern 305. Each observation 310a, 310b, and 310c may be captured at a particular time and each observation 310a, 310b, and 310c may be associated with a pose, 315a, 315b, and 315c, respectively, of the camera at the time that the observation was captured. In particular embodiments, the poses may be captured as part process for capturing each observation (e.g., steps 212 and 213 of the method 200 may be performed in rapid succession. In particular embodiments, from the observations 310a, 310b, and 310c, the camera (or associated computing system) may generate a number of depth maps 320a, 320b, and 320c, respectively. As in step 214, a computing system may determine a series of estimates of the environment, 325a, 325b, and 325c. In particular embodiments, a computing system may use the structured light observations 310a, 310b, and 310c, the depth maps, 320a, and 320b, and 320c, and the corresponding poses 315a, 315b, and 315c in addition to the camera calibration parameters 301a, 302a, and 302a to determine the estimates. Each estimate may provide a singular view of the environment. As in step 215, the many estimates, e.g., estimates 325a, 325b, and 325c, may be combined through one or more suitable fusion techniques to generate an environmental model 330.

After the generation of the environmental model 330, the process may shift to the camera model calibration phase of the process, as indicated on the side of FIG. 3 to the right of the central dividing line. In this phase, the environmental model 330 is taken to be approximately accurate, and the camera calibration model (e.g., parameters 301a, 302a, and 302c) are potentially varied. As in step 220, a computing system may use the environmental model 330, the structured light pattern 305, and the poses 315a, 315b, and 315c to generate predicted observations 340a, 340b, and 340c, of the environment based on the environmental model 330. The predicted observations 340a, 340b, and 340c, may be a prediction of the physical environment based on the determined environmental model 330.

As in step 221, the computing system may compare the predicted observations 340a, 340b, and 340c to the observations 320a, 320b, and 320c, that were captured from the same poses 315a, 315b, and 315c used to generate the predictions. For example, because the predicted observation 340a was generated using the pose 315a and the environmental model 330, it is compared to the captured observation 320a. Similarly, because the predicted observation 340b was generated using the pose 315b and the environmental model 330, it is compared to the captured observation 320b. The captured observations and predicted observations may be represented in a similar format. For example, the captured observations and predicted observations may be represented by depth maps, as deviations of the structured light patterns relative to a template structured light pattern, as point-to-point deviations of structured light patterns, or any other suitable format. Because the environmental model 300 is assumed to be approximately accurate for this step, any differences between the predicted observations and the capture observations may be assumed to derive from the camera calibration model. In particular embodiments, other sources of errors may be assumed and accounted for. For example, one additional source of error may be the detected pose itself. In certain embodiments, as described herein, the motion-detection system may be used as a method to check the accuracy of the detected pose.

The comparison of the predicted observations 340a, 340b, and 340c, to the captured observations 320a, 320b, and 320c, are shown in FIG. 3 as a series of model errors 345a, 345b, and 345c. The comparison may be embodied in any suitable format in a number of embodiments. The model errors may capture a difference between the predicted observation and the captured observation captured at the pose from which the predicted observation was generated. The model errors may comprise a number of point-to-point differences between the structured light pattern (or depth maps) of the captured observations and the predicted observations. Variations between the captured observations and predicted observations may naturally result from the fusion process for generating the environmental model, which provides an "average" of the environmental model based on a number of observations. For example, the model error 345a embodies the deviations between the predicted observation 340a and the captured observations 320a (which was captured at the pose 315a from which the predicted observation 340a was captured). Similarly, the model error 345b embodies the deviations between the predicted observation 340*b* and the captured observation 320*b*. The model error 345*c* embodies the deviations between the predicted observation 340*c* and the captured observation 320*c*.

As in step 224 of the method 200, the camera calibration model may be revised. In particular embodiments, one or more of the parameters included in the camera calibration model (e.g., 301*a*, 302*a*, and 303*a*) may be revised to minimize the collected model errors. The revised camera calibration model parameters (e.g., 301*b*, 302*b*, and 302*c*) may be used as the process flips again to the reconstruction phase of the process, in which the environmental model may again be reconstructed using newly captured observations of the environment. The process may iteratively alternate in this fashion. The process may continue until one or more of a number of stopping conditions are reached. For example, one stopping condition may be that any proposed revisions are determined (e.g., using the methods described herein) to be below a particular threshold, indicating one or both of the models are approximately accurate.

Figure 4:
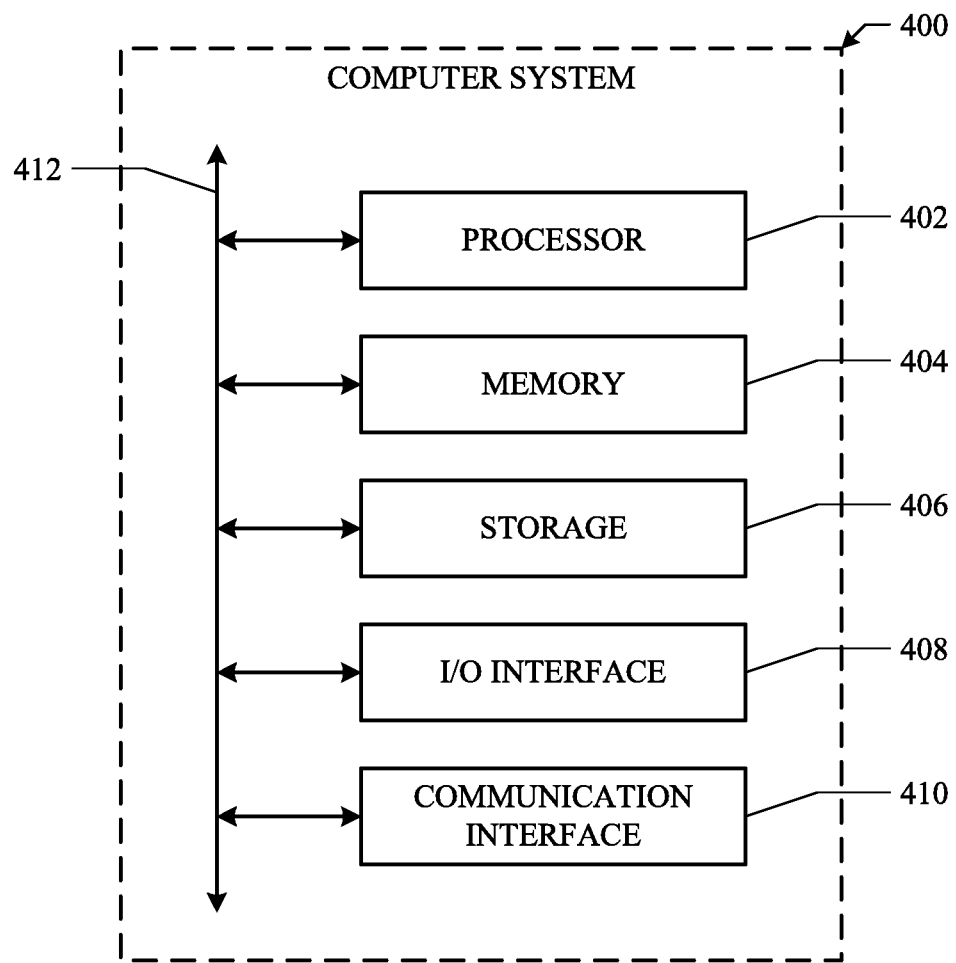
FIG. 4 illustrates an example computer system.

FIG. 4 illustrates an example computer system 400. In particular embodiments, one or more computer systems 400 perform one or more steps of one or more methods described or illustrated herein. In particular embodiments, one or more computer systems 400 provide functionality described or illustrated herein. In particular embodiments, software running on one or more computer systems 400 performs one or more steps of one or more methods described or illustrated herein or provides functionality described or illustrated herein. Particular embodiments include one or more portions of one or more computer systems 400. Herein, reference to a computer system may encompass a computing device, and vice versa, where appropriate. Moreover, reference to a computer system may encompass one or more computer systems, where appropriate.

This disclosure contemplates any suitable number of computer systems 400. This disclosure contemplates computer system 400 taking any suitable physical form. As example and not by way of limitation, computer system 400 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 400 may include one or more computer systems 400; be unitary or distributed; span multiple locations; span multiple machines; span multiple data centers; or reside in a cloud, which may include one or more cloud components in one or more networks. Where appropriate, one or more computer systems 400 may perform without substantial spatial or temporal limitation one or more steps of one or more methods described or illustrated herein. As an example and not by way of limitation, one or more computer systems 400 may perform in real time or in batch mode one or more steps of one or more methods described or illustrated herein. One or more computer systems 400 may perform at different times or at different locations one or more steps of one or more methods described or illustrated herein, where appropriate.

In particular embodiments, computer system 400 includes a processor 402, memory 404, storage 406, an input/output (I/O) interface 408, a communication interface 410, and a bus 412. Although this disclosure describes and illustrates a particular computer system having a particular number of particular components in a particular arrangement, this disclosure contemplates any suitable computer system having any suitable number of any suitable components in any suitable arrangement.

In particular embodiments, processor 402 includes hardware for executing instructions, such as those making up a computer program. As an example and not by way of limitation, to execute instructions, processor 402 may retrieve (or fetch) the instructions from an internal register, an internal cache, memory 404, or storage 406; decode and execute them; and then write one or more results to an internal register, an internal cache, memory 404, or storage 406. In particular embodiments, processor 402 may include one or more internal caches for data, instructions, or addresses. This disclosure contemplates processor 402 including any suitable number of any suitable internal caches, where appropriate. As an example and not by way of limitation, processor 402 may include one or more instruction caches, one or more data caches, and one or more translation lookaside buffers (TLBs). Instructions in the instruction caches may be copies of instructions in memory 404 or storage 406, and the instruction caches may speed up retrieval of those instructions by processor 402. Data in the data caches may be copies of data in memory 404 or storage 406 for instructions executing at processor 402 to operate on; the results of previous instructions executed at processor 402 for access by subsequent instructions executing at processor 402 or for writing to memory 404 or storage 406; or other suitable data. The data caches may speed up read or write operations by processor 402. The TLBs may speed up virtual-address translation for processor 402. In particular embodiments, processor 402 may include one or more internal registers for data, instructions, or addresses. This disclosure contemplates processor 402 including any suitable number of any suitable internal registers, where appropriate. Where appropriate, processor 402 may include one or more arithmetic logic units (ALUs); be a multi-core processor; or include one or more processors 402. Although this disclosure describes and illustrates a particular processor, this disclosure contemplates any suitable processor.

In particular embodiments, memory 404 includes main memory for storing instructions for processor 402 to execute or data for processor 402 to operate on. As an example and not by way of limitation, computer system 400 may load instructions from storage 406 or another source (such as, for example, another computer system 400) to memory 404. Processor 402 may then load the instructions from memory 404 to an internal register or internal cache. To execute the instructions, processor 402 may retrieve the instructions from the internal register or internal cache and decode them. During or after execution of the instructions, processor 402 may write one or more results (which may be intermediate or final results) to the internal register or internal cache. Processor 402 may then write one or more of those results to memory 404. In particular embodiments, processor 402 executes only instructions in one or more internal registers or internal caches or in memory 404 (as opposed to storage 406 or elsewhere) and operates only on data in one or more internal registers or internal caches or in memory 404 (as opposed to storage 406 or elsewhere). One or more memory buses (which may each include an address bus and a data bus) may couple processor 402 to memory 404. Bus 412 may include one or more memory buses, as described below. In particular embodiments, one or more memory management units (MMUs) reside between processor 402 and memory 404 and facilitate accesses to memory 404 requested by processor 402. In particular embodiments, memory 404 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 404 may include one or more memories 404, where appropriate. Although this disclosure describes and illustrates particular memory, this disclosure contemplates any suitable memory.

In particular embodiments, storage 406 includes mass storage for data or instructions. As an example and not by way of limitation, storage 406 may include a hard disk drive (HDD), a floppy disk drive, flash memory, an optical disc, a magneto-optical disc, magnetic tape, or a Universal Serial Bus (USB) drive or a combination of two or more of these. Storage 406 may include removable or non-removable (or fixed) media, where appropriate. Storage 406 may be internal or external to computer system 400, where appropriate. In particular embodiments, storage 406 is non-volatile, solid-state memory. In particular embodiments, storage 406 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 406 taking any suitable physical form. Storage 406 may include one or more storage control units facilitating communication between processor 402 and storage 406, where appropriate. Where appropriate, storage 406 may include one or more storages 406. Although this disclosure describes and illustrates particular storage, this disclosure contemplates any suitable storage.

In particular embodiments, I/O interface 408 includes hardware, software, or both, providing one or more interfaces for communication between computer system 400 and one or more I/O devices. Computer system 400 may include one or more of these I/O devices, where appropriate. One or more of these I/O devices may enable communication between a person and computer system 400. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 408 for them. Where appropriate, I/O interface 408 may include one or more device or software drivers enabling processor 402 to drive one or more of these I/O devices. I/O interface 408 may include one or more I/O interfaces 408, where appropriate. Although this disclosure describes and illustrates a particular I/O interface, this disclosure contemplates any suitable I/O interface.

In particular embodiments, communication interface 410 includes hardware, software, or both providing one or more interfaces for communication (such as, for example, packet-based communication) between computer system 400 and one or more other computer systems 400 or one or more networks. As an example and not by way of limitation, communication interface 410 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 410 for it. As an example and not by way of limitation, computer system 400 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 400 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 400 may include any suitable communication interface 410 for any of these networks, where appropriate. Communication interface 410 may include one or more communication interfaces 410, where appropriate. Although this disclosure describes and illustrates a particular communication interface, this disclosure contemplates any suitable communication interface.

In particular embodiments, bus 412 includes hardware, software, or both coupling components of computer system 400 to each other. As an example and not by way of limitation, bus 412 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 412 may include one or more buses 412, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by a computing device:
accessing a calibration model for a camera rig;
accessing a first plurality of captured observations of an environment captured by the camera rig from a plurality of poses in the environment;
generating an environmental model comprising geometry of the environment based on at least the first plurality of captured observations, the plurality of poses, and the calibration model;
receiving a movement of the camera rig from a movement sensor of the camera rig;
responsive to receiving the movement of the camera rig from the movement sensor, calculating, for one or more poses of the plurality of poses, one or more predictions for observations of the environment based on the environmental model and the one or more poses, wherein each prediction corresponds to a simulated view of the environment as captured in the environmental model;
comparing the one or more predictions calculated based on the environmental model to one or more of the first plurality of captured observations corresponding to the one or more poses from which the one or more predictions were determined;
revising the calibration model to reduce a sum of squared errors in the comparison; and
revising the environmental model based on at least a second plurality of observations of the environment and the revised calibration model.

2. The method of claim 1, further comprising capturing the first plurality of captured observations of the environment by:
projecting, by the camera rig, a structured light pattern into the environment;
detecting, by a camera of the camera rig, the projected structured light pattern in the environment; and
comparing the detected structured light pattern to a template structured light pattern.

3. The method of claim 1, further comprising capturing the first plurality of captured observations of the environment by:
projecting, by the camera rig, a structured light pattern comprising a plurality of points into the environment;
detecting, by a camera of the camera rig, one or more points of the structured light pattern in the environment;
identifying each of the detected points; and
for each identified point, comparing a location of the identified point to a corresponding expected bearing of the identified point in the structured light pattern.

4. The method of claim 1, further comprising:
capturing the pose of the camera rig from which each first observation was captured by receiving the pose of the camera rig from a localization system of the camera rig.

5. The method of claim 4, further comprising:
initializing the localization system of the camera rig based on receiving the movement of the camera rig from the movement sensor of the camera rig.

6. The method of claim 1, further comprising:
capturing the pose of the camera rig from which each observation was captured by localizing the camera rig based on at least the observation and the calibration model.

7. The method of claim 1, wherein generating the environmental model comprising geometry of the environment based on at least the first plurality of captured observations, the plurality of poses, and the calibration model comprises:
generating an estimation of the geometry of the environment from each observation and the pose of the camera rig from which the observation was captured; and
combining the estimations generated from each observation to form the environmental model.

8. The method of claim 1, wherein the one or more predictions and the first plurality of captured observations comprise location information for points of a structured light pattern; and
comparing the one or more predictions to one or more of the first plurality of captured observations corresponding to the one or more poses from which the one or more predictions were determined comprises comparing the location information of each prediction with the location information of the respective corresponding first observation.

9. The method of claim 1, wherein the calibration model for the camera rig comprises:
intrinsic parameters for a camera of the camera rig;
intrinsic parameters for an emitter of the camera rig;
parameters for performing localization of the camera rig in an environment; or
parameters associated with a relationship between the camera and emitter of the camera rig.

10. The method of claim 1, wherein revising the calibration model based on the comparison comprises:
modifying one or more of the parameters of the calibration model to minimize a difference between one or more predictions and one or more of the first plurality of captured observations corresponding to the one or more poses from which the one or more predictions were determined.

11. The method of claim 1, wherein revising the calibration model based on the comparison comprises:
calculating a proposed revised calibration model;
generating a prediction of the geometry of the environment based on the proposed revised calibration model, one or more observations of the environment captured by the camera rig from one or more poses in the environment;
comparing the comparison of the one or more predictions to one or more of the first plurality of captured observations and the prediction of the geometry; and determining that the comparison satisfies a revision threshold corresponding to a likelihood that revising the calibration model will improve the calibration model.

12. The method of claim 1, wherein revising the environmental model based on at least the second plurality of observations of the environment and the revised calibration model comprises:
generating a proposed revised environmental model from the second plurality of observations, a second plurality of poses from which the observations were collected, and the revised calibration model; and
comparing the environmental model and the proposed revised environmental model.

13. The method of claim 1, further comprising:
receiving a second movement of the camera rig from the movement sensor of the camera rig, wherein the environmental model is revised responsive to receiving the second movement of the camera rig from the movement sensor of the camera rig.

14. The method of claim 13, further comprising:
prior to revising the environmental model, determining that the second movement is not an erroneous movement by comparing the second movement of the camera rig to movement of the camera rig determined based on at least the revised camera calibration model and the second plurality of observations of the environment.

15. The method of claim 1, wherein the movement sensor of the camera rig comprises:
an accelerometer;
a gyroscope;
an ultra-sonic movement sensor;
a magnetometer; or
an optical movement sensor.

16. The method of claim 1, wherein a camera of the camera rig is configured to detect infrared light or ultraviolet light.

17. The method of claim 1, wherein the camera rig is incorporated into a head-mounted device.

18. The method of claim 1, wherein the camera rig is incorporated into a hand-held computing device.

19. One or more computer-readable non-transitory storage media embodying software that is operable when executed to:
access a calibration model for a camera rig;
access a first plurality of captured observations of an environment captured by the camera rig from a plurality of poses in the environment;
generate an environmental model comprising geometry of the environment based on at least the first plurality of captured observations, the plurality of poses, and the calibration model;
receive a movement of the camera rig from a movement sensor of the camera rig;
responsive to receiving the movement of the camera rig from the movement sensor, calculate, for one or more poses of the plurality of poses, one or more predictions for observations of the environment based on the environmental model and the one or more poses, wherein each prediction corresponds to a simulated view of the environment as captured in the environmental model;
compare the one or more predictions calculated based on the environmental model to one or more of the first plurality of captured observations corresponding to the one or more poses from which the one or more predictions were determined;
revise the calibration model to reduce a sum of squared errors in the comparison; and
revise the environmental model based on at least a second plurality of observations of the environment and the revised calibration model.

20. A system comprising:
one or more processors; and
one or more computer-readable non-transitory storage media coupled to one or more of the processors and comprising instructions operable when executed by one or more of the processors to cause the system to:
access a calibration model for a camera rig;
access a first plurality of captured observations of an environment captured by the camera rig from a plurality of poses in the environment;
generate an environmental model comprising geometry of the environment based on at least the first plurality of captured observations, the plurality of poses, and the calibration model;
receive a movement of the camera rig from a movement sensor of the camera rig;
responsive to receiving the movement of the camera rig from the movement sensor, calculate, for one or more poses of the plurality of poses, one or more predictions for observations of the environment based on the environmental model and the one or more poses, wherein each prediction corresponds to a simulated view of the environment as captured in the environmental model;
compare the one or more predictions calculated based on the environmental model to one or more of the first plurality of captured observations corresponding to the one or more poses from which the one or more predictions were determined;
revise the calibration model to reduce a sum of squared errors in the comparison; and
revise the environmental model based on at least a second plurality of observations of the environment and the revised calibration model.

\* \* \* \* \*